United States Patent [19]

Beach

[11] 4,302,410
[45] Nov. 24, 1981

[54] METHOD PRODUCING A COLOR CODED, CELLULAR THERMOPLASTIC RESIN COATED WIRE AND THE MATERIALS NECESSARY FOR THE COATING

[75] Inventor: Shirley Beach, North Vancouver, Canada

[73] Assignee: Phillips Cables Limited, Brockville, Canada

[21] Appl. No.: 145,122

[22] Filed: Apr. 30, 1980

Related U.S. Application Data

[63] Continuation-in-part of Ser. No. 32,956, Apr. 24, 1979, which is a continuation of Ser. No. 851,200, Nov. 14, 1977, abandoned.

[51] Int. Cl.$^3$ ............................................... B29D 27/00
[52] U.S. Cl. .................................... 264/45.9; 206/1.9;
206/526; 264/54; 264/142; 264/174; 264/211;
264/DIG. 5; 521/79; 521/95; 521/134;
521/143; 521/920
[58] Field of Search .......... 264/45.9, 54, 211, DIG. 5,
264/DIG. 16, DIG. 18, DIG. 17, 174, 142;
206/1.9, 526; 521/79, 95, 134, 143, 920;
425/113

[56] References Cited

U.S. PATENT DOCUMENTS

| | | | |
|---|---|---|---|
| 2,610,607 | 9/1952 | Isenberg | 425/113 X |
| 2,674,007 | 4/1954 | Allemann et al. | 425/113 |
| 3,015,386 | 1/1962 | Vogt | 206/526 |
| 3,198,328 | 8/1965 | Donahue et al. | 206/526 |
| 3,198,859 | 8/1965 | Tomlinson | 264/DIG. 16 |
| 3,294,224 | 12/1966 | Horwitz | 206/1.9 X |
| 3,404,104 | 10/1968 | Hill et al. | 521/79 |
| 3,424,300 | 1/1969 | Penniman | 206/1.9 X |
| 3,645,930 | 2/1972 | Normanton | 264/DIG. 5 |

FOREIGN PATENT DOCUMENTS

616767  3/1961  Canada ............................ 264/45.9

OTHER PUBLICATIONS

Lasman, Henry R., "Foaming Agents for Polyolefins" In *SPE Journal*, Sep. 1962, pp. 1184–1193.
"The Condensed Chemical Dictionary", Eighth Edition, Revised by Gessner G. Hawley, New York, Van Nostrand Reinhold, ©1971, p. 705.

*Primary Examiner*—Philip Anderson
*Attorney, Agent, or Firm*—Alan Swabey; Robert Mitchell; Guy Houle

[57] ABSTRACT

A particulate concentrate, for example pellets, is provided comprising predetermined amounts of a pigment and a blowing or foaming agent in a polymer matrix. The concentrate can be added to an extruder together with a polymer insulating material for the formation of color-coded cellular insulation on a conductor wire of a cable, for example a communication cable. The composition of the concentrate is so determined that different color-coded, cellular, insulating coatings can be produced which are dielectrically matched, as required.

25 Claims, 1 Drawing Figure

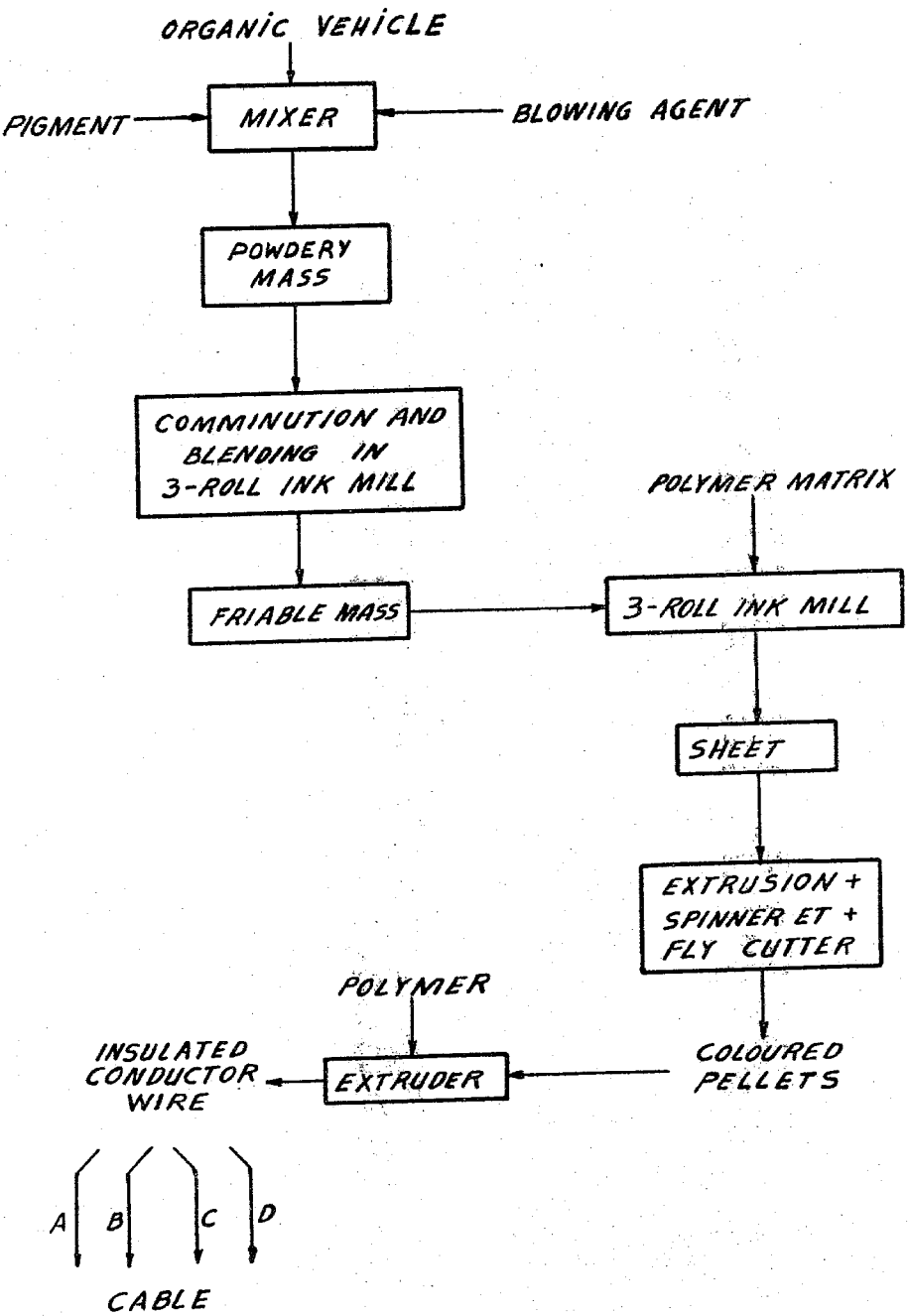

METHOD PRODUCING A COLOR CODED, CELLULAR THERMOPLASTIC RESIN COATED WIRE AND THE MATERIALS NECESSARY FOR THE COATING

CROSS-REFERENCE TO RELATED APPLICATIONS

This application is a continuation-in-part of U.S. Pat. application Ser. No. 06/032,956 filed Apr. 24, 1979, which is a continuation of U.S. Pat. application Ser. No. 851,200, filed Nov. 14, 1977, now abandoned.

BACKGROUND OF THE INVENTION (i) Field of the Invention

This invention relates to colour-coded insulating materials which can be dielectrically matched and their manufacture; more especially the invention is concerned with a process for preparing a particulate concentrate for the manufacture of insulating materials; with a set of separately packaged colour-coded particulate concentrates and with methods for producing a colour-coded, cellularly insulated cable conductor wire and a multi-conductor cable, more especially a communication cable.

(ii) Description of the Prior Art

Insulated cables, for example power and communication cables generally comprise a plurality of insulated conductors enclosed within a waterproof sheath; such cables may consist of groups of two or more such insulated conductors twisted together, for example, a twisted telephone pair or a quad. A communication cable may consist of a plurality of such twisted pairs or quads twisted together.

Frequently the conductors are covered or coated with a cellular insulation and such insulated conductors may be produced by extruding around a conductor wire a thermoplastic polymer containing gas bubbles, produced by the thermal decomposition of a solid chemical blowing or foaming agent or by direct injection of a gas into the polymer in the presence of a nucleating agent and allowing the gas bubbles to expand thus producing the cellular structure.

It is frequently necessary to employ readily indentifiable conductor wires within a cable, and this ready identification may be achieved by the employment of different colours for different wires, so that the wires are colour-coded. By the employment of different colour combinations individual singles, pairs or quads within a group can be readily identified, for example, one pair might comprise a red wire and a blue wire, a second might comprise a red wire and a white wire, a third might comprise a red wire and a green wire and so on.

The different colours are obtained by the employment of appropriate amounts of pigment. It is found, however, that different pigments have different effects on the electrical characteristics of the extruded insulating coatings and in particular different pigments affect the dielectric constant of an insulating polymer to different degrees. Further, the impairment in the dielectric constant is not necessarily linear with respect to the degree of pigmentation.

Differently pigmented polymers are not suitable for insulation of conductors in communication cables if they are electrically mismatched, since, for example, in a telephone cable any mismatching results in crosstalk which is difficult to eliminate.

Systems of electrically matched colour-coded compositions have been developed to overcome this problem of mismatching, which compositions employ particular concentrations of particular pigments. One such system which has found wide acceptance is that described in Canadian Pat. No. 616,767 of John B. Howard and Vincent L. Lanza, issued Mar. 21, 1961, the disclosure of which is herein incorporated by reference. Canadian Pat. No. 616,767 describes eleven colour-coded compositions for producing multi-conductor communication cables in which different coloured insulating coatings are dielectrically matched. One of the colour compositions, namely the gold, has since become obsolete and there are now conventionally employed ten colour-coded compositions based on the compositions described in the aforementioned Canadian Patent.

Thus there are conventionally employed ten visually distinctive colour compositions namely blue, orange, green, brown, slate, white, red, black, yellow and purple.

The present invention is concerned with improvements in the employment of dielectrically matched colour-coded compositions such as those described in the aforementioned Canadian Patent which permits the production of colour-coded, dielectrically matched cellular insulations.

The aforementioned Canadian Patent was concerned primarily with solid insulation coatings, however, with the increasing popularity of cellular insulating coatings in communication cables the same colour-coded systems have been employed in the production of cellular insulations.

In conventional practice the blowing agent and the polymer for the insulation coating are premixed in predetermined amounts having regard to the desired cellular structure and formed into pellets which are added to the screw extruder separately from the pigment.

SUMMARY OF THE INVENTION

The present invention provides a colour-coded particulate concentrate comprising a predetermined amount of a pigment and of a blowing agent in a polymeric matrix, such concentrate is added directly to the screw extruder with the separate addition of the polymer for the insulation coating. The polymer which comprises the polymeric matrix of the concentrate should be compatible with the polymer employed for forming the insulation coating. The particulate concentrate is suitably in the form of pellets or in power form.

The colour-coded concentrate containing both the appropriate amount of pigment and blowing agent permits the cable manufacturer to employ any suitable insulating polymer material to produce colour-coded cellular insulating coating without relying on the supplier of the polymer to incorporate the blowing agent therein.

In practice the blending of polymers and blowing agents is not an easy matter and conventionally employs an intensive mixer such as a Banbury, the mixing being conducted under carefully controlled temperature conditions, to render the polymer sufficiently molten to permit the mixing while at the same time avoiding premature thermal decomposition of the blowing agent. The cable manufacturer is thus largely reliant on the supplier of polymer and the problem arises that different batches of polymer-containing blowing agent may differ.

The polymer-containing blowing agent which is prepared by an outside supplier is termed a "fully let-down" material; clearly a fully let-down material of this type is only available in a limited ratio of blowing agent to polymer and the cable manufacturer cannot readily alter the ratio.

The present invention overcomes this problem since it provides a relatively simple process for preparing a concentrate of the blowing agent and pigment for direct introduction with pellets of the polymer to a screw extruder, which considerably simplifies the extrusion process and permits greater control by the cable manufacturer, as well as the production of uniform dielectrically matched colour-coded insulating coatings.

No premature thermal decomposition of the blowing agent has occurred at the time that it is introduced with the polymer pellets into the screw extruder. Thus the cable manufacturer is able to exercise greater control over extrusion conditions, and to vary the ratio of blowing agent to polymer as desired, thus providing versatility in the degree of blow and in the density of the extruded insulation coating, as well as permitting the ready production of uniform dielectrically matched, colour-coded insulating coatings.

According to the invention there is provided a process for preparing a particulate concentrate comprising a pigment and a solid blowing agent in a polymeric matrix for use in admixture with a thermoplastic electrically insulating polymer in the manufacture of colour-coded insulating materials, particularly dielectrically matched colour-coded insulating materials, which comprises: mixing a weighed amount of pigment composition and a weighed amount of a blowing agent composition with a weighed amount of a solid, thermoplastic, electrically insulating polymer to form an intimate blend of said polymer and said compositions, the weighed amount of pigment composition being selected to provide a colour-coded insulating material, particularly to provide a dielectric matching amount in a colour-coded insulating material.

In a particular embodiment the intimate blend is pelletized to form a pelletized concentrate.

According to another aspect of the invention there is provided a set of colour-coded particulate concentrates, for example pellets for use in the manufacture of colour-coded insulating materials, especially dielectrically matched materials comprising a plurality of separately packaged coloured concentrates, each package containing concentrate of a single colour, each concentrate comprising a particulate pigment and a particulate solid blowing agent in predetermined amounts in a matrix of a thermoplastic polymer, the concentrate contained in each individual package being substantially uniform in composition, and the concentrates in each package being dielectrically matchable with the concentrates in the other packages of said plurality.

According to a still further aspect of the invention there is provided a method of producing a cable conductor wire insulated with a colour-coded, cellular thermoplastic electrically insulating polymer material in extruded form, which comprises providing a thermoplastic electrically insulating polymer material and a predetermined amount of a particulate concentrate, for example as pelletized material comprising predetermined amounts of a particulate pigment composition and of a particulate, solid chemical blowing agent material in a polymer matrix compatible with said insulating polymer material, introducing said polymer material and said particulate concentrate into a screw extruder barrel, containing a screw mounted for rotation therein, to form a mixture, passing the mixture through said barrel, heating and shearing the mixture in said barrel to melt said polymer material and form an intimate mixture of said pigment composition and said blowing agent material in said polymer material allowing said blowing agent to thermally decompose to a gaseous product, forcing the resulting molten mixture through an extrusion head and about a moving conductor wire to form an extruded coating, thereon, allowing the extruded coating to expand a predetermined amount, and collecting the conductor wire insulated with colour-coded, cellular, thermoplastic electrically insulating polymer material.

According to yet another aspect of the invention there is provided a method of producing a multiconductor cable containing a plurality of colour-coded insulated conductors which comprises producing a plurality of conductor wires insulated with cellular thermoplastic electrically insulating polymer material by the method of the invention as described in the preceding paragraph, and forming said plurality of conductors into a multiconductor cable.

In a particular embodiment of this latter aspect of the invention the method is applied to the production of a multiconductor communication cable containing a plurality of colour-coded, dielectrically matched, insulated conductor, in which the particulate concentrate of each extruding operation is employed in a weighed amount so that the resulting plurality of colour-coded, insulated conductors is dielectrically matached; the plurality of conductors being formed into a multiconductor communication cable.

DESCRIPTION OF THE PREFERRED EMBODIMENTS

Concentrate Manufacture

(i) Direct Method

In the manufacture of the particulate concentrate composition which suitably comprises amounts of a particular pigment, opacifier and antioxidant according to the teaching of the aforementioned Canadian Pat. No. 616,767 a pigment composition is first mixed in a predetermined amount with a predetermined amount of a particulate blowing agent in the presence of an organic vehicle.

The amounts of pigment composition and blowing agent are predetermined so that the concentrate contains the appropriate relative amounts of pigment and blowing agent, such that the addition to the screw extruder of a given predetermined weight of the particulate concentrate will provide the required amount of blowing agent for the cellular structure desired as well as the required amount of pigment to colour the insulation coating so that the colour is visibly discernible for identification purposes and so that insulation coatings of different colours for communication cables, containing different pigments, will be dielectrically matched.

The percentage amounts of different pigment compositions necessary for dielectric matching are already described in the aforementioned Canadian patent in relation to the polymer insulating material so that it requires only a simple calculation and measuring techniques to determine the quantity of concentrate to be employed relative to the quantity of polymer material to obtain the required pigment content. This having been established it similarly requires a simple calculation to determine the amount of blowing agent required in the concentrate so that the same aforementioned quantity of concentrate contains the required amount of blowing agent for the desired cellular structure.

According to this method predetermined amounts of pigment composition and blowing agent material are mixed in a first step, with the organic vehicle to form a powdery mass.

In the formation of the powdery mass the particulate materials are wetted with the vehicle and a mechanical mixing is accomplished; this is suitably achieved in a high intensity or low intensity mixer.

The mixing may be carried out at an elevated temperature in order to lower the viscosity of the organic vehicle so as to facilitate the mixing. However, caution is required since the temperature should not be so high as to initiate thermal decomposition of the blowing agent and because elevated temperatures can adversely affect many of the pigments employed, particularly the organic pigments.

The organic vehicle is employed in an amount sufficient to wet the particulate materials and form a powdery mass; the organic vehicle is suitably one which is compatible both physically and electrically with the polymer which is subsequently to form the matrix of the particulate concentrate, and the polymer which is to form the cellular insulation.

A temperature of up to about 150° C. can be employed to facilitate the mixing with the organic vehicle without adversely affecting the pigment and without significant decomposition of the blowing agent.

It is desirable that the materials not be exposed to high temperatures for prolonged periods, since prolonged exposure even to temperatures below 150° C. may adversely affect the materials particularly the blowing agent. Preferably the mixing temperature should not be more than 120° C. and more preferably not more than 105° C. Generally when mixing at a temperature of 105° C., the mixing time should not exceed 30 minutes, and preferably should not be longer than 10 minutes.

In the case in which the organic vehicle is a viscous, liquid polybutene a temperature of about 66° C. (150° F.) is adequate to facilitate the mixing without adversely affecting the pigment and without significant decomposition of the blowing agent.

The thus obtained dry powdery mass is subjected to a comminuting and blending or dispersing process to produce a friable mass. In this stage agglomerates of blowing agent material and pigment composition in the dry powdery mass are comminuted and are intimately blended or dispersed with the organic vehicle to produce thoroughly wetted particles in which the pigment composition and blowing agent material are coated with the organic vehicle.

This fine comminution and dispersion may conveniently be achieved in a three roll ink mill of the kind employed in the manufacture of ink compositions. The rolls of the ink mill have a very small clearance, typically of the order of 1 to 20, more especially 1 to 2 thousanths of an inch and this results in a fine uniform grinding and dispersion of the agglomerates. The material is suitably passed over the ink mill rolls in a succession of passes suitably for up to about 10 minutes to produce a highly-sheared intimate blending and dispersion of the powders in the organic vehicle.

In this stage the comminuting and dispersion may suitably be carried out at an elevated temperature, typically the same temperature as employed in the first stage. In this respect the three rolls of the ink mill are conveniently internally cooled or heated, as necessary to obtain a desired temperature to effect optimum comminuting and dispersion.

The resulting friable mass of wetted particles is carefully weighed and added to a weighed amount of a thermoplastic electrically insulating polymer as the matrix material and the friable mass and polymer are intimately blended. The blending may suitably be carried out in a high intensity or low intensity blender to blend or disperse the blowing agent and pigment in the insulating polymer. The blending may also be carried out in a three roll ink mill of the kind described previously.

This operation is suitably carried out at a temperature at which the insulating polymer is flowable or plastic and preferably molten, particularly at a temperature which is just above the melt temperature of the insulating polymer.

The insulating polymer is suitably employed in an amount such that the concentrate contains 20 to 75%, preferably at least 40%, particularly 40 to 65%, more preferably 40 to 55% by weight of the polymer; the ratio of the organic vehicle in the particulate concentrate to the insulating polymer in the concentrate suitably may be from 10:90 to 30:70, more particularly 20:80 to 50:50.

The resulting powdered concentrate consisting of the blowing agent, pigment, organic vehicle and insulating polymer may be used as such or may be subjected to a pelletizing operation to provide the concentrate in the form of pellets.

The pelletizing may comprise feeding the blended mixture through an extruder equipped with a breaker plate and strainer screens, for example, 100 mesh screens, and from there into a die or spinneret having an opening of, for example, about $\frac{1}{8}$ inch diameter and thence through a water cooled fly cutter or pelletizer cutter where the extrudate from the die is chopped into, for example about $\frac{1}{8}$ inch lengths. In this way there can be obtained uniformly sized cylindrical pellets of a desired diameter and length, for example, a diameter of about $\frac{1}{8}$ inch and a length of about $\frac{1}{8}$ inch. The pellets may be air-dried for packaging, for example, in a cyclone.

Organic Vehicle

The organic vehicle is suitably one which is both physically and electrically compatible with the insulating polymer, which is subsequently to form the matrix of the particulate concentrate, and the insulating polymer which is to form the cellular insulation.

The organic vehicle should be flowable and can be a liquid vehicle including a viscous liquid or a cold flowable or plastic solid vehicle which flows when subjected to shear forces, that it will wet the particulate blowing agent and pigment.

Suitable organic vehicles include viscous hydrocarbon polymer liquids, for example, polybutenes; having a number average molecular weight of about 300 to 1900 and a viscosity ranging from about 150 cps to about 5000 cps at 72° F.; hydrocarbon waxes, particularly polyethylene waxes, which melt at about 75° C. to about 120° C., preferably 85° C., to 120° C. have a flow index of about 300 to 400 m/min, and have a molecular weight of about 2,500 to about 12,000; and low density polyethylenes, which melt or flow at about 120° C. to about 150° C., and which have a molecular weight 50,000 to about 200,000.

The organic vehicle may comprise one or more of these three classes of material.

A particularly suitable organic vehicle, as indicated above, is a low molecular weight viscous polybutene. Polybutene is especially suitable when the polymer insulation and polymer matrix are both polyethylenes, since the properties of polybutene approach those of polyethylene particularly in respect of electrical equivalency, polybutene having a very low specific inductance capacity (S.I.C.), a very low power factor and a very high volume resistivity.

Particularly the low molecular weight polybutenes have an S.I.C. of about 2.25 whereas low molecular weight polyethylene has an S.I.C. of from about 2.2 to 2.3.

In an especially preferred embodiment the organic vehicle comprises a polybutene and a polyethylene wax, as described above in a weight ratio of 0:50 to 20:30.

An especially suitable polybutene is that available under the trademark Indopol L-14 available from Amoco Chemicals Corp. In addition the polyethylene waxes and low density polyethylenes are suitable especially when the polymer insulation is a polyethylene. A preferred polyethylene wax is Polyethylene AC6A available from Allied Chemical Company.

Blowing Agent

The solid chemical blowing or foaming agents employed in the invention are solid organic compounds which thermally decompose with liberation of gas. Suitable blowing agents include azodicarbonamide, 4,4'-oxybis(benzenesulphonylhydrazide), N-aminophthalamide and N,N'-dinitrosopentamethylenetetraamine.

The most commonly employed solid, thermally decomposable blowing agent for the production of cellular insulated coatings particularly in the communication cable industry is azodicarbonamide; the commercial grade of azodicarabonamide used by, for example, the communication cable industry may include a hydrated silica additive having a controlled water content which acts as an anti-plateout agent. The hydrated silica evolves water on heating which reacts with isocyanic or cyanic acid, produced in the thermal decomposition of azodicarbonamide, to prevent formation and decomposition of solid cyanuric acid and cyamelide which would otherwise build-up on the surface of the screw and die during extrusion. in the form of a white powder or pasty substance, which interferes with the satisfactory operation of the extrusion; also these substances act as contaminants affecting the electrical properties of the cellular insulation.

Commercially available blowing and foaming agent materials in general are compounded to eliminate or minimize plate-out.

The blowing agent is suitably employed in an amount by weight of 0.5 to 1.2, preferably 0.5 to 1.0, more preferably 0.75 parts by weight per 100 parts by weight of polymer material in the insulating coating. The amount of blowing agent in the particulate concentrate is thus preferably determined so that a given weight of pellets will provide an amount of blowing agent in the aforementioned range per 100 parts of total polymer material, in the insulating coating to be formed.

Pigment

The pigment employed is suitably a particulate pigment composition comprising amounts of a particular pigment, an opacifier and an antioxidant according to the teaching of the aforementioned Canadian Pat. No. 616,767. However, other pigments may be employed.

Organic pigments are usually used to produce the blue, red, green, yellow, orange and purple and brown colours for the insulation. The black colour is provided by carbon black, and the white colour by titanium dioxide; the slate composition is suitably a mixture of the black and white compositions.

The pigment composition is determined so that visibly discernible colour-coded cellular insulations can be produced employing the particulate concentrate of the invention.

In the case of particulate concentrates, used in the manufacture of communication cables, the pigment composition is additionally determined so that dielectrically matched coloured coded insulations can be produced. By dielectrically matched is meant that the colour-coded insulated materials have substantially the same dielectric constant, the maximum dielectric mismatch being no greater than about 2%, preferably no greater than 1%, and more preferably no more than 0.7%, as taught in the aforementioned Canadian patent.

Insulating Polymer Coating

The insulating polymer employed with the particulate concentrate is selected from those generally employed as insulation coatings for electrically conductive wires. In particular the polymer may be a low density polyethylene, a medium density polyethylene, a high density polyethylene, polypropylene, ethylene vinyl acetate copolymer or plasticized polyvinyl chloride.

For communication cable insulating coatings the polymer is preferably one of the olefin polymers, particularly a low density polethylene, which melts or flows at about 120° C. to about 150° C., and high density polyethylene which has a density of about 0.94 to about 0.95 and melts at a temperature of 270° F. to 360° F.

Insulating Polymer Matrix of Concentrate

The insulating polymer for the matrix of the particulate concentrate is suitably a solid flowable or plastic polymer, which flows when subjected to shear forces. The polymer matrix should also be physically and electrically compatible with the insulating polymer to be extruded with the concentrate to form the extruded coating. An especially preferred insulating polymer for the matrix is low density polyethylene which melts or flows at about 120° C. to about 150° C.

(ii) Indirect Method

In another embodiment of the particulate concentrate manufacture a concentrate of the solid blowing agent is formed containing a known amount of the blowing agent, and a predetermined amount of the concentrate is mixed with a predetermined amount of a pigment concentrate having a known pigment composition content, and a predetermined amount of a solid particulate thermoplastic electrically insulating polymer material.

The ingredients are mixed and blended until a uniformly blended mixture is obtained. This may be achieved in a blender, for example, a Pony mixer or a Ribbon blender.

The resulting blended mixture may suitably be extruded to produce uniform strands or rods, which may be cut with a suitable cutter to yield pellets of a size appropriate for use in dispensing equipment used in the wire and the cable industry in the production of cellular insulation.

The extrusion is similar to that described above in connection with the Direct Method.

The amounts of pigment composition and blowing agent are predetermined as in the case of the Direct Method so that the particulate concentrates contain the appropriate relative amounts of pigment and blowing agent such that the addition to the screw extruder of a given predetermined weight of the final concentrate with the insulating polymer will provide the required amount of blowing agent for the cellular structure desired as well as the required amount of pigment to colour the insulation coating so that the colour is visibly discernible for identification purposes and so that insulation coatings of different colours and containing different pigments will be, when necessary, dielectrically matched.

Blowing Agent Concentrate

In one step of the process a concentrate of a chemical blowing agent or foaming agent is produced.

The chemical blowing or foaming agents employed are as described in connection with the Indirect Method.

In the preparation of the blowing agent concentrate a predetermined or weighed amount of blowing agent material having a known content of blowing agent is mixed with the organic vehicle, which includes a solid particulate, thermoplastic, electrically insulating polymer material. The mixing is continued until a uniform powder of agglomerates is obtained.

The blowing agent is suitably employed in an amount by weight of 0.5 to 1.2, preferably 0.5 to 1.0, more preferably 0.75 parts by weight per 100 parts by weight of polymer material in the insulating coating. The amount of blowing agent in the blowing agent concentrate is thus preferably determined so that a given weight of final particulate concentrate will provide an amount of blowing agent in the aforementioned range per 100 parts of total polymer material, in the insulating coating to be formed.

The uniform powder of agglomerates is comminuted and intimately blended in a milling or grinding device, for example, a three roll ink mill of the kind described in connection with the Direct Method. A fine uniform grinding of the agglomerates is achieved to produce a dry, flaky powder in which the blowing agent material is wetted by the organic vehicle.

The dry, flaky powder comprises particles of the blowing agent material surrounded by the organic vehicle.

The particles of the blowing agent concentrate typically have an average particle size of 0.5 to 25, preferably 1 to 5 and more preferably about 3 microns.

The blowing agent concentrate contains 10 to 70 parts by weight of the blowing agent material and 30 to 90 parts by weight of the organic vehicle. In particular the blowing agent concentrate may comprise 25 to 40, especially 30 to 40 parts of the solid polymer and 0 to 50, especially 5 to 50 parts by weight of a viscous liquid vehicle such as a polybutene, to a total of 100 parts.

In a particular embodiment the organic vehicle is added to a weighed amount of the particulate blowing agent material, for example, a non-plating azodicarbonamide composition, while mixing, and a weighed amount of the solid polymer is added. These ingredients are mixed until a uniform mix is obtained.

When the organic vehicle is used, it is suitably employed in an amount sufficient to wet the particulate blowing agent material mass; the organic vehicle is suitably one which is compatible both physically and electrically with the polymer which is subsequently to form the matrix of the particulate concentrated pellet, and the polymer which is to form the cellular insulation.

A particularly suitable organic vehicle is a low molecular weight polybutene having a number average molecular weight of about 300 to about 1900 and a viscosity of from 150 cps to 5000 cps at 72° F. Polybutene is especially suitable when the polymer insulation and polymer matrix both comprise a polyethylene as indicated above in connection with the Direct Method.

The polymer is suitably employed in an amount such that the concentrate contains 20 to 75%, preferably 40 to 75%, more preferably 40 to 55%, by weight of the polymer; the ratio of viscous liquid organic vehicle, for example, polybutene fluid, in the concentrate to the polymer in the concentrate is suitably from 0:50 to 20:30.

Pigment Concentrate

A pigment concentrate is formed which comprises a particulate pigment composition suitably comprising amounts of a particular pigment, an opacifier and an antioxidant according to the teaching of the aforementioned Canadian Pat. No. 616,767.

In forming the pigment concentrate, a desired pigment composition in powder form is mixed with an organic vehicle and the polymer carrier, the ingredients being mixed until a uniform mixture is obtained.

The mixture is comminuted and dispersed in a manner similar to that employed for the blowing agent concentrate. In this way there is formed a dry flaky powder of the pigment composition. The size of the flakes depends on the pigment composition.

The pigments which produce the blue, red, green, yellow, orange and purple and brown colours for the insulation are typically organic pigments which consist of fine particles in the pigment concentrate typically having an average dimension of 0.025 to 0.125 microns, and preferably about 0.05 microns. The black colour which is usually provided by carbon black is present as particles in the pigment concentrate having an average dimension of 0.1 to 50, preferably about 20 millimicrons. The white colour provided by titanium dioxide forms tiny agglomerates in the dry flaky powder having an average dimension of 0.1 to 50 microns and preferably an average dimension of about 5 microns.

The slate composition is usually a mixture of the black and white compositions.

The composition of the pigment concentrate is determined with the same requirements as described with reference to the Direct Method.

The percentage amounts of different pigment compositions necessary for dielectric matching are already described in the aforementioned Canadian Patent in relation to the polymer insulating material, so that it requires only a simple calculation and use of conventional measuring techniques to determine the quantity of pellets to be employed relative to the quantity of polymer material to obtain the required pigment content. This having been established it similarly requires a simple calculation to determine the amount of blowing agent required in the pellets so that the same aforementioned quantity of pellets contains the required amount of blowing agent for formation of the desired cellular structure.

The preparation of the blowing agent concentrate and the pigment concentrate may suitably be carried out at room temperature. However, an elevated temperature may be employed in order to lower the viscosity of the organic vehicle, so as to facilitate the mixing. In this case caution is required since the temperature should not be so high as to initiate a premature thermal decomposition of the blowing agent. Elevated temperatures may also adversely affect many of the pigments employed particularly the organic pigments, consequently the temperature should not be so high as to affect the pigment.

Packaging of Colour-Coded Concentrate

The colour-coded concentrates, which preferably are pellets may be packaged in a variety of ways ready for use as will be evident. For example, pellets of one colour may be packaged in strong paper bags, labelled to fully identify them a separate bag being provided for each colour of pellets. Alternatively pellets of different colours might be packaged in a compartmentized container having two or more separated compartments and employing a separate compartment for each colour of pellets. For example, a two-compartment carton or drum might be employed for the separate packaging of red and blue pellets.

It will be recognized that all such modes of packaging the particulate concentrates so that concentrates of the same colour are packaged together and separately from concentrates of a different colour are envisaged in this invention.

Cable Manufacture

In the manufacture of a cable conductor wire insulated with a colour-coded insulation, the particulate concentrate suitably in the form of pellets of a particular colour are introduced into the feed hopper of a screw extruder together with a crystalline thermoplastic electrically insulating polymer material, which polymer material may suitably comprise a single homopolymer or a mixture of homopolymers. Polyolefins including polyethylene, polypropylene and mixtures thereof are especially preferred, with polyethylene in particular being widely employed in the cable industry. When the insulating polymer is a polyethylene, a low density, medium density or high density polyethylene is employed. The polypropylenes are high molecular weight, high melting point materials. Mixtures of a polyethylene with a polypropylene represent a material of intermediate physical characteristics.

The quantity of concentrate added is carefully controlled so as to provide the requisite amount of blowing agent and pigment for the amount of polymer material added.

The concentrate and polymer are forced through the screw extruder by rotation of the screw and are subjected to shearing and heating in the screw extruder barrel to melt the polymer material and intimately mix the polymer and the ingredients of the concentrate. At the temperatures employed the blowing agent begins to decompose during its passage through the barrel. When the mixture is extruded through a die of an extruder head, gas bubbles generated from the decomposing blowing agent begin to form and expand rapidly in the extruded material at the die exit. The molten mass is forced through the extruder head and about a moving conductor wire to form a coating on the wire. Simultaneously the gas bubbles in the extruded coating expand to produce the cellular structure; the degree of expansion being suitably controlled by means of a moving water trough, for example, as described in U.S. Pat. No. 3,896,198, Atushi Utumi et al issued July 22, 1975.

In producing a communication cable for example, a telephone cable, from a plurality of colour-coded conductor wires the conductor wires are suitably twisted into groups, for example, pairs or quads in distinctive colour combinations. The wires may be conveniently twisted together employing the method and apparatus described in Canadian Pat. No. 963,361 of Glen R. Forester issued Feb. 25, 1975. The latter Canadian Patent describes a total method for the manufacture of a communication cable. There may similarly be employed procedures such as those described in Canadian Pat. No. 982,804, Shirley Beach, issued Feb. 3, 1976, in which a plurality of colour-coded conductors is enclosed in a longitudinally wrapped sheath, for example, of aluminium tape, which forms a complete envelope, an extruded jacket being formed around the sheath.

In addition to communication cable other types of insulating conductors can be made using the procedures, including power cable. Cables which can be produced utilizing the procedures of the invention include telephone cable, CATV cable and Micro-coaxial cable.

It will be recognized that methods of assembling insulated conductors into communication cables are well known and the present invention does not reside in the assembly method per se.

BRIEF DESCRIPTION OF THE DRAWING

The invention is further illustrated by reference to the accompanying drawing in which FIG. 1 is a flow diagram illustrating in a preferred embodiment the steps of producing a concentrate in pellet form and cable according to the invention.

With further reference to FIG. 1, there is illustrated in a simplified form a process of producing pellets, the employment of the pellets in a method of producing a colour-coded insulated conductor wire and the production of a cable from insulated wire combinations A, B, C and D each of which comprises a twisted pair of a distinct colour combination.

EXAMPLES

The invention is further illustrated by reference to the following examples illustrating particular embodiments of the invention.

EXAMPLE 1

In a Mixmuller there was introduced in parts by weight:

white pigment (rutile $TiO_2$): 11.5 parts
blowing agent (azodicarbonamide): 15 parts
organic vehicle (polybutene fluid): 25 parts The ingredients were mixed together at room temperature in the Mixmuller for 15 minutes at which time the particles were fully wetted by the polybutene and the mixture is a uniform powder blend.

The powder blend was then fed through a three roll ink mill at room temperature for 10 minutes to produce a uniform, flaky powder, as a friable mass.

The friable mass was blended by a Pony mixer in an amount of 40 parts by weight with 60 parts by weight of AC8 TM low density polyethylene having a melt flow index of about 330 gms/min. The mixture was passed through a three roll ink mill for 10 minutes at a temperature of about 180° F. to produce a thin sheet material.

The thin sheet material was cut into strips and fed into a screw extruder, where the strips were worked under shearing action at a temperature of about 180° F.

The mixture was extruded as a continuous cylinder having a diameter of ⅛ inch which was fed into a water cooled fly cutter where the water evolved extrudate was chopped into ⅛ inch length.

The resulting pellets were dried in a cyclone.

EXAMPLE 2

In this Example a conductor wire with a white coded cellular insulation was produced employing the pellets obtained in Example 1 and a host resin comprising a high density polyethylene having a crystalline melting point of about 260° F. The objective was to produce a cellularly insulated conductor in which the cellular insulation has 55% of its volume occupied by cells.

The host resin and the pellets were carefully fed into a screw extruder in proportions such that the host resin contained 1.2%, by weight, of azodicarbonamide. The pellets and host resin were sheared in the extruder at a temperature of 385° F., at which temperature the azodicarbonamide decomposed. The resulting mixture was extruded around a moving conductor wire and there was thus obtained a white cellular insulated conductor wire having a coaxial capacitance of 52 pico farads.

By similar procedures and employing pigment compositions such as those described in the aforementioned Canadian Pat. No. 616,767, there was obtained a plurality of colour-coded cellular insulated conductor wires all having a coaxial capacitance of 52 pico farads from which telephone cable could be produced in which the different colour-coded wires were dielectrically matched.

The cellular colour-coded insulating coatings produced are somewhat lighter in colour that the solid colour-coded insulating coatings produced according to the aforementioned Canadian patent, however, they are visibly discernible to the eye.

EXAMPLE 3

In a Pony mixer there was introduced in parts by weight:

white pigment (rutile $TiO_2$): 25 parts
blowing agent (non-plating type-azodicarbonamide): 35 parts
organic vehicle (polybutene fluid): 15 parts
polymeric vehicle (polyethylene wax): 25 parts The ingredients were mixed together at room temperature in the Pony mixer for 10 minutes at which time the particles were fully blended with the vehicle and the mixture is a uniform powder blend.

The powder blend was then fed through a three roll ink mill at room temperature for 10 minutes to produce a uniform flaky powder.

The flaky powder was then blended in a Pony mixer in an amount of 60 parts by weight with 40 parts by weight of a low density polyethylene having a melt flow index number of 2 and a density of 0.925, to form a uniform granular powder concentrate.

The resultant free flowing powder concentrate was fed into a screw extruder, where the concentrate was worked under shearing action at a temperature of about 180° F.

The mixture was extruded as a continuous strand having a diameter of ⅛ inch which was fed into a pelletizer cutter where extrudate was chopped into about ⅛ inch lengths.

EXAMPLE 4

In this Example a conductor wire with a white coded cellular insulation was produced employing the pellets obtained in Example 1 and a host resin comprising a high density polyethylene of density 0.945 having a crystalline melting point of about 260° F. The objective was to produce a cellularly insulated conductor in which the cellular insulation has 55% of its volume occupied by cells.

The host resin and the pellets were carefully fed into a screw extruder in proportions such that the host resin contained 1.2%, by weight, of azodicarbonamide as active blowing agent. The pellets and host resin were sheared in the extruder at a temperature of 385° F., at which temperature the azodicarbonamide decomposed. The resulting mixture was extruded around a moving conductor wire and there was thus obtained a white cellular insulated conductor wire having a coaxial capacitance of 52 pico farads.

By similar procedures and employing pigment compositions such as those described in the aforementioned Canadian Pat. No. 616,767, there was obtained a plurality of colour-coded cellular insulated conductor wires all having a coaxial capacitance of 52 pico farads from which telephone cable could be produced in which the different colour-coded wires were dielectrically matched.

The cellular colour-coded insulating coatings produced are lighter in colour than the solid colour-coded insulating coatings produced according to the aforementioned Canadian patent. However, they are visibly discernible to the eye, or if desired, can be intensified by use of higher concentrations of colouring pigment in the concentrate.

I claim:

1. A method of producing a cable conductor wire insulated with a colour-coded, cellular thermoplastic electrically insulating polymer material in extruded form, which comprises:

providing a thermoplastic electrically insulating polymer material and a weighed amount of a particulate concentrate comprising weighed amounts of a particulate pigment composition and of a particulate, solid chemical blowing agent material in a polymer matrix compatible with said insulating polymer material, introducing said polymer material and said particulate concentrate into a screw extruder barrel, containing a screw mounted for rotation therein, to form a mixture, passing the mixture through said barrel, heating and shearing the mixture in said barrel to melt said polymer material and form an intimate mixture of said pigment composition and said blowing agent material in said polymer material, allowing said blowing agent to thermally decompose to a gaseous product, forcing the resulting molten mixture through an extrusion head and about a moving conductor wire to form an extruded coating thereon, allowing the extruded coating to expand a predetermined amount, and collecting the conductor wire insulated with colour-coded, cellular thermoplastic electrically insulating polymer material.

2. A method according to claim 1, in which said polymer matrix and said polymer material are both low density polyethylene having a melt temperature in a range of about 120° C. to about 150° C.

3. A method according to claim 1, wherein said blowing agent material comprises azodicarbonamide.

4. A method according to claim 1, wherein said particulate concentrate is in the form of pellets.

5. A method of producing a multi-conductor communication cable containing a plurality of colour-coded dielectrically matched conductors comprising:

producing a plurality of conductor wires insulated with colour-coded cellular thermoplastic insulating polymer material according to the method of claim 1, the particulate concentrate of each extruding operation being employed in a weighed amount such that the resulting colour-coded plurality of conductors is dielectrically matched, and forming said plurality of conductors into a multiconductor communication cable.

6. A method according to claim 5, wherein said plurality comprises colour-coded insulated conductor wires of at least two different colours.

7. A method according to claim 5, in which said polymer matrix and said polymer material are both low density polyethylene having a melt temperature in the range of about 120° C. to about 150° C.

8. A method according to claim 5, wherein said blowing agent material comprises azodicarbonamide.

9. A method according to claim 5, wherein said particulate concentrate is in pellet form.

10. A method according to claim 9, including the steps of wrapping said dielectrically matched, insulated conductor wires in a tape effective to form an electrical shield and extruding a jacket of insulating material around the electric shield.

11. A process for preparing a particulate concentrate comprising a pigment and a solid blowing agent in a polymeric matrix for use in admixture with a thermoplastic, electrically insulating polymer in the manufacture of colour-coded insulating materials which comprises mixing a weighed amount of a pigment composition and a weighed amount of a blowing agent composition with a weighed amount of a solid, thermoplastic electrically insulating polymeric matrix material to form an intimate blend of said matrix material and said compositions, said blend comprising 40 to 65% by weight of said matrix material, and recovering the blend as a particulate concentrate, said weighed amount of pigment composition being selected to provide a colour-coded insulating material having a visibly discernible colour for identification purposes, and said weighed amount of blowing agent composition being selected to provide an amount of 0.5 to 1.2 parts of blowing agent, by weight, per 100 parts, by weight, of total insulating polymer when said concentrate is admixed with the insulating polymer.

12. A process according to claim 1, wherein said amount of pigment composition is selected to provide a dielectric matching amount in colour-coded insulating material.

13. A process according to claim 12, in which said polymeric matrix material is a low molecular weight polyethylene which flows when subjected to shear forces, and which has a melt temperature in the range of about 95° C. to 120° C.

14. A process according to claim 12, wherein said blowing agent in said blowing agent composition is azodicarbonamide.

15. A process according to claim 3, wherein said mixing is carried out at an elevated temperature, below a temperature at which thermal decomposition of the blowing agent is initiated, and below a temperature at which said pigment composition is adversely affected, and for a period of time so as to avoid prolonged exposure of the ingredients to said elevated temperatures.

16. A process according to claim 3, in which said intimate blend is pelletized to form said concentrate as pellets.

17. A process for preparing a pelletized concentrate comprising a pigment and a solid blowing agent in a polymeric matrix for use in admixture with a solid, thermoplastic electrically insulating polymer, in the manufacture of dielectrically matched colour-coded insulating materials which comprises:

(i) mixing a weighed amount of a particulate, pigment composition and a weighed amount of a particulate solid, chemical blowing agent composition with a flowable, organic vehicle, which is electrically and physically compatible with said electrically insulating polymer to form a powdery mass, (ii) comminuting and intimately blending the powdery mass to produce a friable mass in which particles of the pigment and blowing agent compositions are coated with the organic vehicle, (iii) mixing a weighed amount of the friable mass with a weighed amount of a solid, thermoplastic, electrically insulating polymeric matrix material, which is electrically and physically compatible with said insulating polymer to form an intimate blend, said blend comprising 40 to 65%, by weight of said polymeric matrix material, and having an organic vehicle to polymeric matrix material ratio of from 10:90 to 30:70, and pelletizing the intimate blend;

said weighed amount of blowing agent composition being selected to provide an amount of 0.5 to 1.2 parts of blowing agent, by weight, per 100 parts, by weight, to total insulating polymer when said pellets are admixed with the insulating polymer, and said weighed amount of pigment composition being selected to provide a dielectric matching amount in colour-coded insulating material in which the dielectric mismatch is no greater than 2%.

18. A process according to claim 17, wherein said organic vehicle is a low molecular weight polyethylene having a melt temperature in the range of about 95° C. to 120° C.

19. A process according to claim 17, wherein said organic vehicle is a polybutene having a number average molecular weight of about 300 to 1900 and a specific inductance capacity of about 2.25.

20. A process according to claim 10, wherein said blowing agent is azodicarbonamide.

21. A process according to claim 9, wherein said organic vehicle comprises a blend of a polybutene and a polyethylene wax in a weight ratio of 0:50 to 20:30.

22. A set of colour-coded pellets for use in admixture with a thermoplastic, electrically insulating polymer in the manufacture of dielectrically matched colour-coded insulating materials comprising a plurality of separately packaged colour pellets, each package containing pellets of a single colour, each pellet comprising a particulate pigment composition and a particulate organic, solid blowing agent composition in predetermined amounts in a matrix of a thermoplastic polymer, said pellets comprising 40 to 65%, by weight of said matrix, and said predetermined amount of blowing agent being effective to provide an amount of 0.5 to 1.2 parts of blowing agent, by weight, per 100 parts, by weight, of total insulating polymer when said pellets are mixed with said insulating polymer, the pellets contained in each individual package being substantially uniform in composition, and the pellets in each package being dielectrically matchable with the pellets in the other packages of said plurality to provide a dielectric matching amount in colour-coded insulating material formed by extruding pellets of a single colour and a thermoplastic electrically insulating polymer material, in which the dielectric mismatch is no greater than 2%.

23. A set according to claim 22, wherein pellets of at least two different colours are separately packaged according to colour, in at least two separated compartments of a single container, there being at least one compartment for each different colour.

24. A set according to claim 22, wherein pellets of different colours are separately packaged in individual containers according to their colour so that each individual container contains pellets of one colour only.

25. A set according to claim 22, wherein said blowing agent comprises azodicarbonamide and said polymer matrix is a low molecular weight polyethylene.

* * * * *